(12) United States Patent
Sekine (10) Patent No.: US 11,453,089 B2
(45) Date of Patent: Sep. 27, 2022

(54) BONDING STRUCTURE

(71) Applicant: NAPRA CO., LTD., Tokyo (JP)

(72) Inventor: Shigenobu Sekine, Tokyo (JP)

(73) Assignee: Napra Co., Ltd., Tokyo (JP)

( * ) Notice: Subject to any disclaimer, the term of this patent is extended or adjusted under 35 U.S.C. 154(b) by 155 days.

(21) Appl. No.: 16/574,826

(22) Filed: Sep. 18, 2019

(65) Prior Publication Data

US 2021/0078112 A1    Mar. 18, 2021

(51) Int. Cl.
  *B32B 15/00*  (2006.01)
  *B23K 35/26*  (2006.01)
  *C22C 13/00*  (2006.01)

(52) U.S. Cl.
  CPC ............ *B23K 35/262* (2013.01); *C22C 13/00* (2013.01); *Y10T 428/12056* (2015.01)

(58) Field of Classification Search
  CPC ........................ B23K 35/262; B23K 35/0244; B23K 35/025; B23K 35/22; C22C 13/00; C22C 1/0491; B22F 2301/40; B22F 2303/15
  USPC ........................................................ 420/560
  See application file for complete search history.

(56) References Cited

U.S. PATENT DOCUMENTS

| | | |
|---|---|---|
| 6,514,359 B2 | 2/2003 | Kawano |
| 8,281,978 B2 | 10/2012 | Ikeda et al. |
| 2017/0232562 A1* | 8/2017 | Maeno ............... B23K 35/0238 228/262.61 |

FOREIGN PATENT DOCUMENTS

| | | | |
|---|---|---|---|
| JP | 2001-342549 A | 12/2001 | |
| JP | 2007-268569 A | 10/2007 | |
| JP | 2009-141197 A | 6/2009 | |
| JP | 2013-143243 A | 7/2013 | |
| JP | 6029222 B1 | 11/2016 | |
| JP | 6205083 B1 * | 9/2017 | ............. B23K 35/26 |
| JP | 6374072 B1 * | 8/2018 | ............. B23K 35/14 |
| JP | 2018150614 A * | 9/2018 | ............... B22F 1/00 |

* cited by examiner

*Primary Examiner* — Seth Dumbris
(74) *Attorney, Agent, or Firm* — Carrier Blackman & Associates, P.C.; Willaim D. Blackman; Joseph P. Carrier (57) ABSTRACT

Disclosed is a bonding structure that includes an intermetallic compound crystal composed of Sn and Cu, and, an Sn alloy matrix composed of Sn and Cu, being intended for bonding a metal body or an alloy body, the intermetallic compound crystal forming an endotaxial junction with the Sn alloy matrix, and the Sn alloy matrix and/or the intermetallic compound crystal forming an epitaxial junction with the metal body or the alloy body.

8 Claims, 8 Drawing Sheets

TEM IMAGE OF INTERFACE OF SUBSTRATE
(AFTER HEATED), NO VOID

Cu SUBSTRATE

Cu-Sn
IMC FORMATION AREA

Sn MATRIX

FIG. 2A-c

INTERFACE

BONDING STRUCTURE

INCORPORATION BY REFERENCE

This application is based on Japanese Patent Application No. 2017-153952, filed on Aug. 9, 2017, the content of which is incorporated hereinto by reference.

1. Field of the Invention

This invention relates to a bonding structure.

2. Description of the Related Art

Ever-advancing IoT (Internet of Things) and growing requirements for energy saving have increasingly appreciated power semiconductor device as the key for the technology. Effective usage thereof has, however, faced various problems. The power semiconductor device that handles large electric power, as a result of high voltage and large current, produces a large amount of heat and becomes hot. Silicon power semiconductor device, currently required to be heat resistant up to 175° C. or around, is under development in pursuit of further durability up to 200° C. or around. Moreover, next-generation power semiconductor device using SiC or GaN is still further required to be durable up to 250 to 500° C. This naturally requires a highly heat resistant bonding material used for bonding a chip and a substrate. There has, however, been no bonding material that satisfies such requirements. For example, an SnAgCu-based bonding material (powdery solder material) disclosed in JP-A-2007-268569 is no more than applicable to the current power semiconductor device compliant to 175° C. or around, and is not applicable to the power semiconductor device compliant to higher temperatures.

A breakthrough for the bonding material is necessary for full demonstration of performances of the power semiconductor device. A bonding material having high heat resistance and high reliability, and being free of environmental pollutant such as lead, if launched into the market, would dramatically grow the power electronics industry that employs the power semiconductor device.

Meanwhile, the present applicant proposes, in Japanese Patent No. 6029222, a metal particle composed of a shell and a core, the core containing a metal or an alloy, the shell being composed of a mesh-like intermetallic compound that covers the core, the core containing Sn or an Sn alloy, and the shell containing the intermetallic compound composed of Sn and Cu. A bonding part formed by using the metal particle can keep high heat resistance, bonding strength and mechanical strength over a long period, even when kept under prolonged operation at high temperatures, or even when used under harsh environments such as causing large temperature change between operation at high temperatures and idling at low temperatures.

The metal particle disclosed in Japanese Patent No. 6029222 has a double-layered structure composed of the shell and the core, and is intended for suppressing Kirkendall void from occurring, by interposing the intermetallic compound in the shell at the interface with the mating object to be bonded, so as to suppress mutual diffusion of Cu or other element with the mating object to be bonded. However in a bonding process where the metal particle is melted at high temperatures, it has not been always easy to allow the intermetallic compound to distribute over the mating object to be bonded, so as to bring the intermetallic compound in the shell into contact with the mating object as uniformly as possible.

SUMMARY OF THE INVENTION

It is therefore an object of this invention to provide a bonding structure having the heat resistance, bonding strength and mechanical strength, all at higher levels than in the prior art.

The present inventors found, from our extensive examinations, that the aforementioned problem may be solved by a bonding structure formed using a metal particle in which a high-temperature phase intermetallic compound having a monoclinic, hexagonal or other crystal structure precipitates, and, in which the precipitation interface establishes an endotaxial junction with the matrix. The finding led us to complete this invention.

This invention is summarized as follows:

1. A bonding structure that includes an intermetallic compound crystal composed of Sn and Cu, and, an Sn alloy matrix composed of Sn and Cu, being intended for bonding a metal body or an alloy body, the intermetallic compound crystal forming an endotaxial junction with the Sn alloy matrix, and the Sn alloy matrix and/or the intermetallic compound crystal forming an epitaxial junction with the metal body or the alloy body.

2. The bonding structure according to 1, wherein the intermetallic compound crystal has a monoclinic, cubic or hexagonal system.

3. The bonding structure according to 1 or 2, wherein the Sn alloy matrix forms the epitaxial junction with the metal body or the alloy body.

4. The bonding structure according to any one of 1 to 3, wherein the metal body or the alloy body is composed of simple metal, alloy or intermetallic compound of at least one metal selected from the group consisting of Sn, Cu, Al, Ni, Si, Ag, Au, Pt, B, Ti, Bi, In, Sb, Ga, Zn, Cr and Co.

5. The bonding structure according to any one of 1 to 4, wherein the bonding structure contains 3 to 85% by volume of the intermetallic compound crystal.

Sn has a tetragonal crystal structure in a temperature range from approximately 13° C. to approximately 160° C. (Sn having a tetragonal crystal structure is referred to as β-Sn), which changes to a cubic crystal structure (Sn having a cubic crystal structure is referred to as α-Sn) in a lower temperature range. The crystal structure of β-Sn changes to orthorhombic in a temperature range above approximately 160° C. (Sn having an orthorhombic crystal structure is referred to as γ-Sn). It is widely known that phase transition, particularly between tetragonal β-Sn and cubic α-Sn, is accompanied by a large volumetric change.

The metal particle used in this invention is unique in that the monoclinic, hexagonal or other type of intermetallic compound crystal forms the endotaxial junction with the Sn alloy matrix even at approximately 160° C. or below (at normal temperature, for example), so that the Sn alloy matrix is contained as a stable alloy phase. For example in the process of bonding using a bonding material that contains such metal particle, the bonding material, if kept in a semi-molten state rather than in a full-molten state so as to retain the intermetallic compound crystal having monoclinic, cubic or hexagonal crystal structure, can maintain the endotaxial junction after cooled down into a temperature range of 160° C. or below (at normal temperature, for example), and the Sn alloy matrix can maintain the stable alloy phase. Such maintenance of the endotaxial junction allows the Sn alloy matrix to stay in the stable alloy phase which is less likely to cause phase transition from tetragonal β-Sn to cubic α-Sn even if the temperature is lowered to a certain extent, successfully preventing a large volumetric change due to phase transition to α-Sn during temperature drop.

While electronic components employs various kinds of metal such as Cu, Ag, Au, Ni and so forth, the Sn alloy can bond with these metal successfully.

The metal particle used in this invention, in which the monoclinic, hexagonal or other type of intermetallic compound crystal forms the endotaxial junction with the Sn alloy matrix over a wide temperature range (at normal temperature, for example), is advantageously less likely to cause a large volumetric change due to phase transition from tetragonal β-Sn to cubic α-Sn under temperature change, and can bond with various metals employed in electronic components. The metal particle is therefore useful especially for a bonding material to be applied to fine bonding part.

The metal particle used in this invention, even with an additional reactive metal contained therein, can provide a metal particle gifted with characteristics of such additional reactive metal, without modifying the structure and characteristics of the endotaxial junction between the monoclinic, hexagonal or other type of intermetallic compound crystal, and the Sn alloy matrix. For example, combination with a metal having electroconductivity larger than that of Sn can yield a metal particle that excels in electroconductivity and is well suppressed from causing volumetric change over a relatively wide temperature range. Meanwhile, the metal particle, having precipitated therein an intermetallic compound of Sn and the reactive metal, can have heat resistance higher than that of Sn, since the melting point of such intermetallic compound is higher than that of Sn.

In still another mode where the Sn alloy matrix and such other metal form the endotaxial junction or epitaxial junction, it now becomes possible to provide a metal particle capable of forming a junction that can contribute to suppress whisker migration over a temperature region wider than in the prior art, in cooperation with the structure in which the monoclinic, cubic, hexagonal or other type of intermetallic compound crystal forms endotaxial junction with the Sn alloy matrix.

The bonding structure of this invention is also advantageous over other Sn-containing bonding materials such as SAC, in terms of reduced volumetric change under temperature change, since the monoclinic, cubic, hexagonal or other type of intermetallic compound crystal forms the endotaxial junction with the Sn alloy matrix even in a temperature region of 160° C. or below (at normal temperature, for example), and since the Sn alloy matrix forms the epitaxial junction with the electrode in a bonding part in inter-electrode bonding.

BRIEF DESCRIPTION OF THE DRAWINGS

FIGS. 2A-a to 2A-d are transmission electron diffraction patterns of a monoclinic intermetallic compound crystal in the metal particle obtained in Example;

FIGS. 2B-a to 2B-c are electron microphotographs (TEM images) of a cross section of the metal particle obtained in Example, in which the intermetallic compound crystal forms the endotaxial junction with the Sn alloy matrix;

DESCRIPTION OF THE EMBODIMENTS

This invention will be further detailed below.

First of all, the terms used in this specification are defined as follows, even if not specifically noted.

(1) The term "metal" covers not only simple metal element, but occasionally covers also alloy or intermetallic compound containing a plurality of metal elements.

(2) A certain simple metal element, when referred to herein, means not only an absolutely pure substance made of such metal element, but also substances containing slight amounts of other ingredient. In other words, the meaning of course does not exclude the cases where trace impurities that are almost not influential to such metal are contained. For example, when referred to as "Sn alloy matrix", the matrix encompasses those having Cu, Ni, Ge, Sb, Ga, Si, Ti or Al contained so as to replace a part of Sn atoms in the crystal.

(3) The term "endotaxial junction structure" means a structure in which a substance that forms metal or alloy has other substance (intermetallic compound) precipitated therein to form a crystal grain, while creating a lattice-matched junction between these substances (for example, between alloys, between metals, and between intermetallic compounds).

(4) The term "epitaxial junction" means a junction formed as a result crystal growth on an underlying metal or alloy body (electrode, for example), while creating an interface where a crystal plane of the underlying body and the crystal plane of the Sn alloy matrix and/or the intermetallic compound crystal are bonded in a lattice-matched manner.

The metal particle used in this invention uniquely has a crystal structure in which the intermetallic compound crystal forms the endotaxial junction with the Sn alloy matrix.

The metal particle used in this invention is manufacturable typically from a starting material combining 8% by mass of Cu and 92% by mass of Sn (referred to as 8Cu.92Sn, hereinafter). The metal particle used in this invention is obtainable by properly controlling environmental conditions so that the precipitated intermetallic compound will have monoclinic, hexagonal or other crystal structure, and will solidify to form the endotaxial junction together with the Sn alloy matrix, for example by melting 8Cu.92Sn, then by feeding the molten metal on the dish-like disk spinning at a high speed in a nitrogen gas atmosphere, so as to scatter the molten metal by the centrifugal force to produce fine droplets, followed by cooling to solidify the droplets under reduced pressure.

Figure 3:
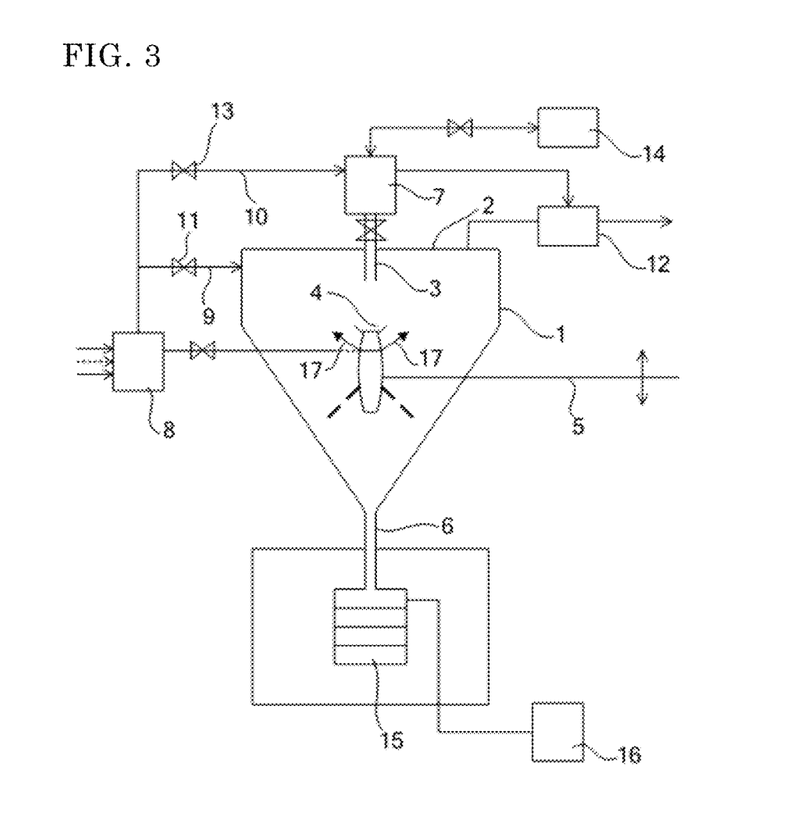
FIG. 3 is a schematic drawing explaining an exemplary equipment suitable for manufacturing the metal particle used in this invention.
Figure 4A:
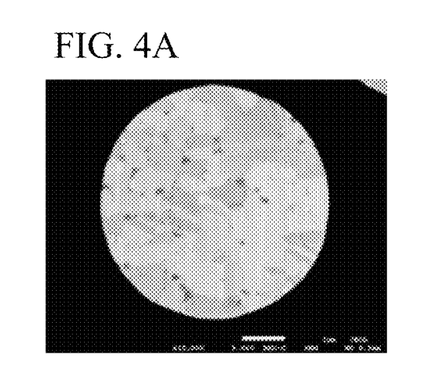
FIGS. 4A to 4D are SEM images, based on STEM-EDS mapping, of a cross section of a prior SnAgCu-based bonding material (powdery solder material with a particle size of 5 μm)
Figure 4B:
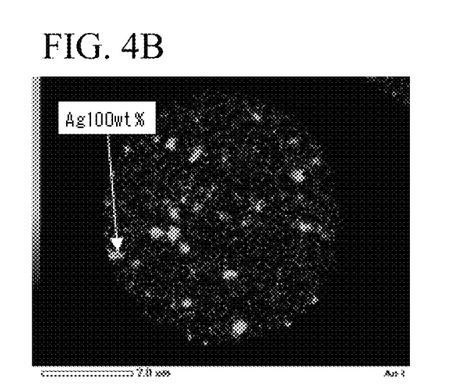
Figure 4C:
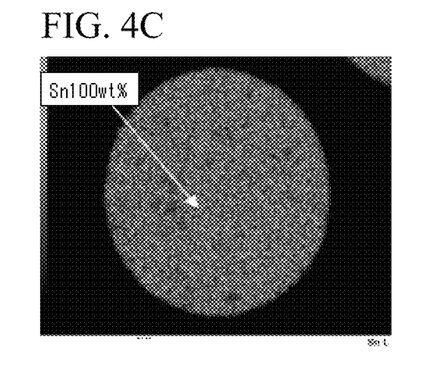
Figure 4D:
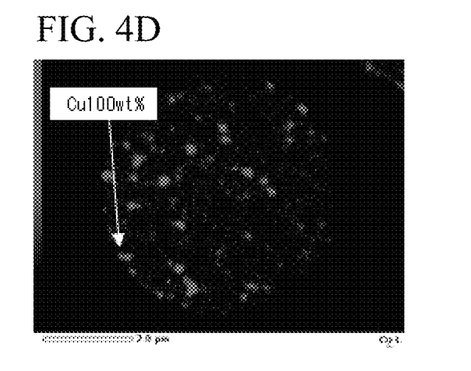

An exemplary manufacturing apparatus suitable for manufacturing the metal particle is explained referring to FIG. 3. A granulation chamber 1 has a cylindrical top part and a conical bottom part, and has a lid 2 on the top. A nozzle 3 is perpendicularly inserted at the center of the lid 2, and a dish-type rotating disk 4 is arranged directly below the nozzle 3. Reference sign 5 denotes a mechanism that moves up and down the dish-type rotating disk 4. At the lower end of the conical bottom part of the granulation chamber 1, there is connected a delivery pipe 6 through which produced fine particles are output. The top end of the nozzle 3 is connected to an electric furnace (high frequency induction furnace) 7 that melts a metal to be granulated. An atmospheric gas controlled to contain predetermined ingredients in a mixed gas tank 8 is fed through a pipe 9 and a pipe 10 respectively into the granulation chamber 1 and to an upper part of the electric furnace 7. Pressure in the granulation chamber 1 is controlled by a valve 11 and an exhaust apparatus 12, meanwhile pressure in the electric furnace 7 is controlled by a valve 13 and an exhaust apparatus 14. Molten metal fed through the nozzle 3 on the dish-type rotating disk 4 is scattered by centrifugal force of the dish-type rotating disk 4 to produce fine droplets, and then cooled under reduced pressure to produce solid particles. The thus produced solid particles are fed through the delivery pipe 6 to an automatic filter 15 and classified. Reference sign 16 denotes a particle collection apparatus.

A process of solidifying the molten metal under cooling is important for forming the crystal structure of the metal particle used in this invention.

Typical conditions are as follows:

dish-type rotating disk 4: with a dish-type disk having an inner diameter of 60 mm, and a depth of 3 mm, rotated at 80,000 to 100,000 rpm; and granulation chamber 1: evacuated using a vacuum chamber with an evacuation performance up to $9 \times 10^{-2}$ Pa or around, feeding nitrogen gas at 15 to 50° C. while being concurrently evacuated, to keep the pressure inside the granulation chamber 1 to $1 \times 10^{-1}$ Pa or below.

The metal particle manufactured under such conditions is 20 μm or smaller in diameter for example, which typically ranges from 2 μm to 15 μm.

The thus manufactured metal particle may be processed into sheet or paste, which may be brought into contact with an object to be bonded, allowed to melt only incompletely and then to solidify, to achieve successful bonding.

A sheet composed of the metal particle 1 used in this invention is obtainable typically by subjecting the metal particle to pressure welding under rollers as described below. That is, the metal particle used in this invention is fed between a pair of pressure contact rollers that rotate in opposite directions, and the powder is pressurized by the pressure contact rollers while being heated therethrough up to 100° C. to 150° C. The sheet made from the metal particle used in this invention is thus obtained.

The metal particle used in this invention may alternatively be allowed to disperse in an organic vehicle to obtain an electroconductive paste.

Note that the sheet or the electroconductive paste may be mixed with other particle such as SnAgCu-based alloy particle and/or Cu particle without adversely affecting the effects of this invention, so as to obtain a mixture of the metal particle. Such other particle may be coated with a metal such as silicon.

Figure 6:
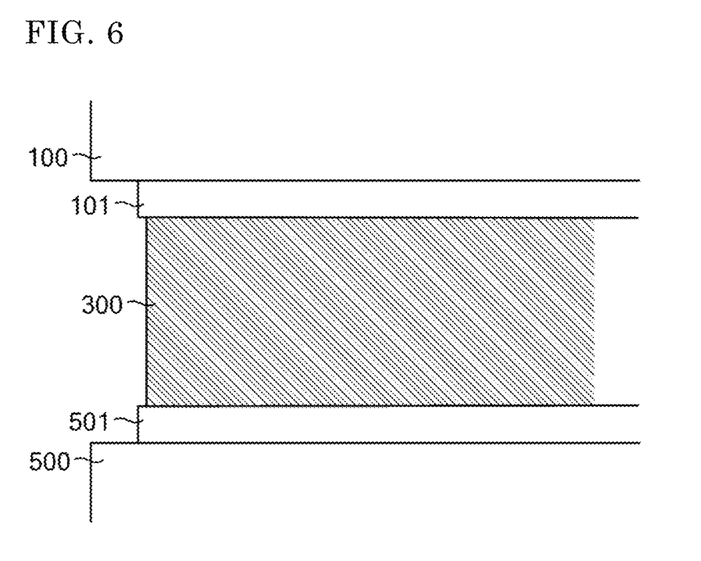
FIG. 6 is a schematic cross sectional view illustrating a structure of the bonding structure of this invention.

FIG. 6 is a schematic cross sectional view explaining a structure of the bonding structure of this invention.

As seen in FIG. 6, a bonding structure 300 mutually bonds metal/alloy bodies 101, 501 (Cu electrodes, in FIG. 6) respectively formed on substrates 100, 500 that are arranged opposingly. The bonding structure 300 contains the intermetallic compound crystal and the Sn alloy matrix, the intermetallic compound crystal forms the endotaxial junction with the Sn alloy matrix, and the Sn alloy matrix is bonded with the metal bodies or alloy bodies 101, 501. The intermetallic compound is typically composed of $Cu_6Sn_5$ (and also $Cu_3Sn$).

The substrates 100, 500, provided with semiconductor elements, are typically those composing electrical/electronic devices such as power device, meanwhile the metal/alloy bodies 101, 501 are bonding materials typically in the form of electrodes, bumps, terminals, or lead conductors integrally provided on the substrates 100, 500. In the electrical/electronic devices such as power device, the metal/alloy bodies 101, 501 are usually composed of Cu or Cu alloy. This, however, does not preclude any components that correspond to the substrates 100, 500 from being composed of such metal/alloy bodies.

The bonding structure of this invention may be formed using the aforementioned metal particle used in this invention. The present inventors has confirmed that the bonding structure of this invention, obtained by using the metal particle after heating, has a crystal structure similar to the crystal structure of the metal particle.

The metal particle used in this invention has the crystal structure in which the intermetallic compound crystal forms the endotaxial junction with the Sn alloy matrix. Meanwhile, the bonding structure of this invention has a structure in which the Sn alloy matrix and/or the intermetallic compound crystal, and the metal/alloy bodies 101, 501 are kept to form the epitaxial junction.

EXAMPLE

This invention will further be explained referring to Example and Comparative Example, without limiting this invention.

Example 1

Using 8Cu.92Sn as a starting material and the manufacturing apparatus illustrated in FIG. 3, a metal particle with a diameter of approximately 3 to 13 μm was manufactured.

Conditions employed were as follows:

dish-type rotating disk 4: with a dish-type disk having an inner diameter of 60 mm, and a depth of 3 mm, rotated at 80,000 to 100,000 rpm; and granulation chamber 1: evacuated using a vacuum chamber with an evacuation performance up to $9 \times 10^{-2}$ Pa or around, feeding nitrogen gas at 15 to 50° C. while being concurrently evacuated, to keep the pressure inside the granulation chamber 1 to $1 \times 10^{-1}$ Pa or below.

Figure 1:
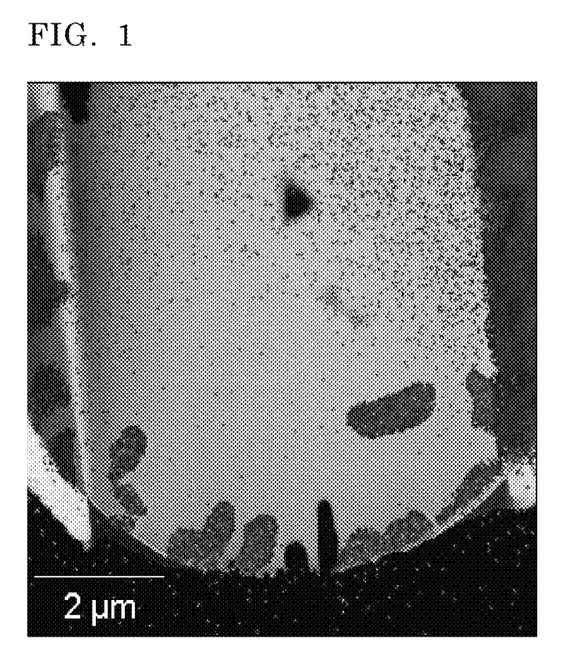
FIG. 1 is a SEM image, based on STEM-EDS mapping, of a cross section of a metal particle used in this invention, obtained in Example.

FIG. 1 is a SEM image, based on STEM-EDS mapping, of a cross section of the metal particle used in this invention, obtained in Example. It is observed from FIG. 1 that the metal particle used in this invention contains the intermetallic compound crystal and the Sn alloy matrix.

Figure 2A:
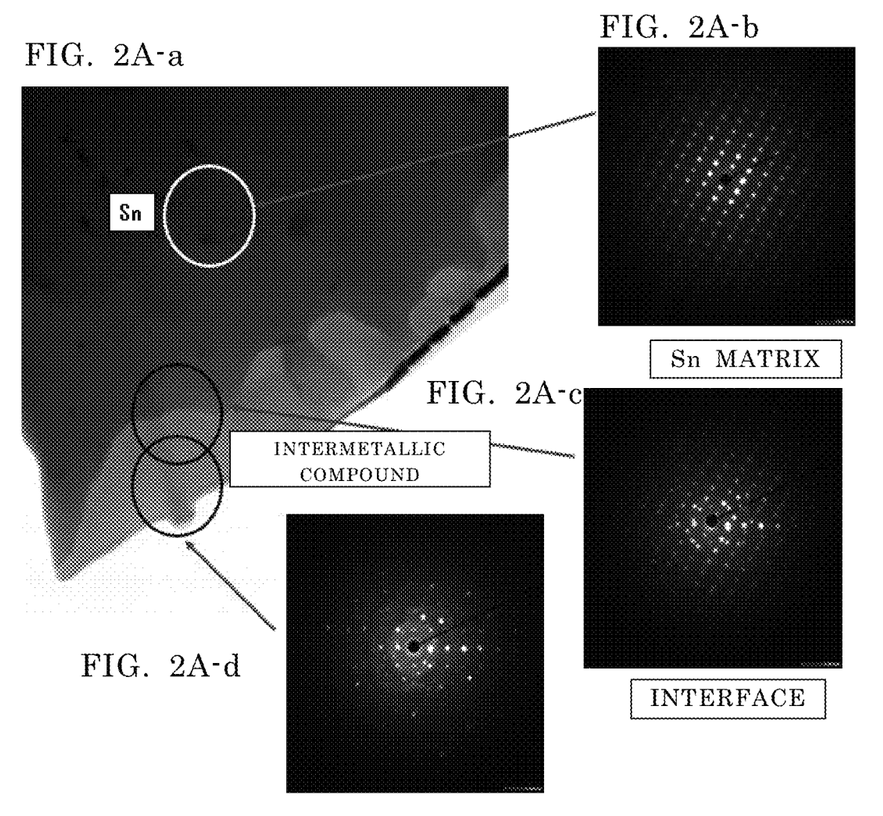
Figure 2B:
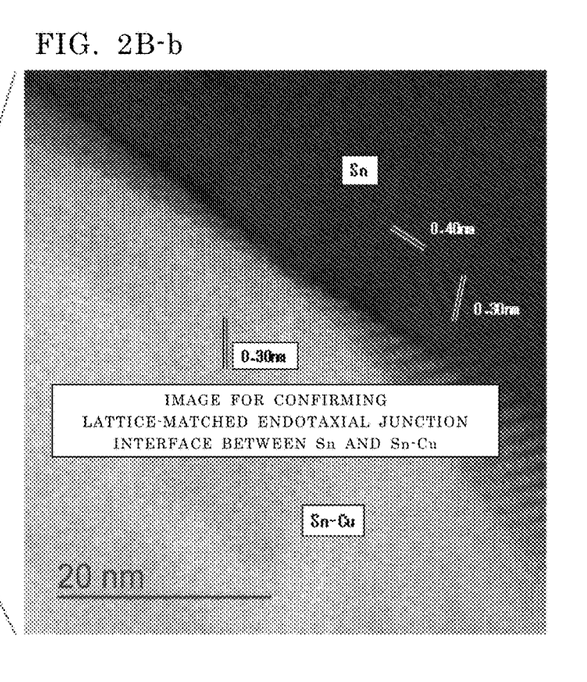

FIGS. 2A-a to 2A-d are transmission electron diffraction patterns obtained from different sites in the metal particle, which includes metal particle (FIG. 2A-a), Sn alloy matrix (FIG. 2A-b), intermetallic compound crystal (FIG. 2A-d), and interface between Sn alloy matrix and intermetallic compound crystal (FIG. 2A-c). From FIG. 2A-d, the intermetallic compound crystal was confirmed to have a monoclinic crystal structure.

FIGS. 2B-a to 2B-c are electron microphotographs (TEM images) of cross section of the metal particle, in which the monoclinic intermetallic compound crystal forms the endotaxial junction with the Sn alloy matrix, in the metal particle (FIG. 2B-a) obtained in Example. In FIG. 2B-b, it was observed that the monoclinic intermetallic compound crystal that contains Sn and Cu forms the endotaxial junction with the Sn alloy matrix forms. Now the endotaxial junction means a state in which the Sn alloy matrix and the intermetallic compound precipitated therein during production of the metal particle, are bonded in a lattice-matched manner. FIG. 2B-c shows a transmission electron diffraction pattern of an interface between the Sn alloy matrix and the intermetallic compound crystal.

The transmission electron diffraction patterns shown in FIGS. 2A-a to 2A-d and the electron microphotographs (TEM images) in FIGS. 2B-a to 2B-c were observed at normal temperature (room temperature).

Next, the thus obtained metal particle was cold welded into sheet, and the obtained sheet was subjected to a high temperature storage (HTS) test conducted at 350° C. It was observed that the shear strength increased from approximately 60 MPa up to approximately 80 MPa over a 100-hour period after the start of test, and remained constant at around 60 MPa in the time zone beyond 100 hours.

It was also found from a temperature cycle test (TCT) (−40 to 200° C.), that the shear strength remained constant at around 50 MPa, approximately beyond the 200-th cycle and over the whole cycles thereafter (1000 cycles).

As a Comparative Example, FIGS. 4A to 4D are SEM images, based on STEM-EDS mapping, of cross sections of a conventional SnAgCu-based bonding material (powdery solder material with a particle size of 5 μm). It was confirmed from FIGS. 4A to 4D that the conventional SnAgCu-based bonding material is free of intermetallic compound, instead having a single metal element dispersed therein. It is therefore a matter of course that there is no observable endotaxial junction between the intermetallic compound crystal and the Sn alloy matrix, unlike this invention. It was also confirmed that Sn—Cu alloy that forms the metal matrix does not have the intermetallic compound crystal structure as a stable phase in high-temperature operating region. Such conventional SnAgCu-based bonding material is almost hopeless to achieve heat resistance and strength, comparable to those of the metal particle used in this invention.

Then homogeneously mixed were 70 parts by mass of the thus obtained metal particle and 30 parts by mass of Si-coated Cu powder, and the mixture was subjected to dry powder rolling to manufacture a presheet (50 μm thick).

The sheet was placed between Cu electrodes that form the metal body, and then subjected to melt bonding. The bonding structure was formed by using the metal particle used in this invention, which was allowed to melt initially at the melting point of Sn (231.9° C.). Remelting temperature of the bonding structure after solidified is governed by the melting points of $Cu_xSn_y$, ($Cu_3Sn$: approx. 676° C., $Cu_6Sn_5$: approx. 435° C.), which are higher than the melting point of Sn. The bonding structure that excels in heat resistance, reliability and quality may therefore be formed. Such characteristics of the bonding structure were found to be effective for electrical interconnect and electroconductive bonding material used in power control semiconductor element that causes large heat emission.

Figure 5A:
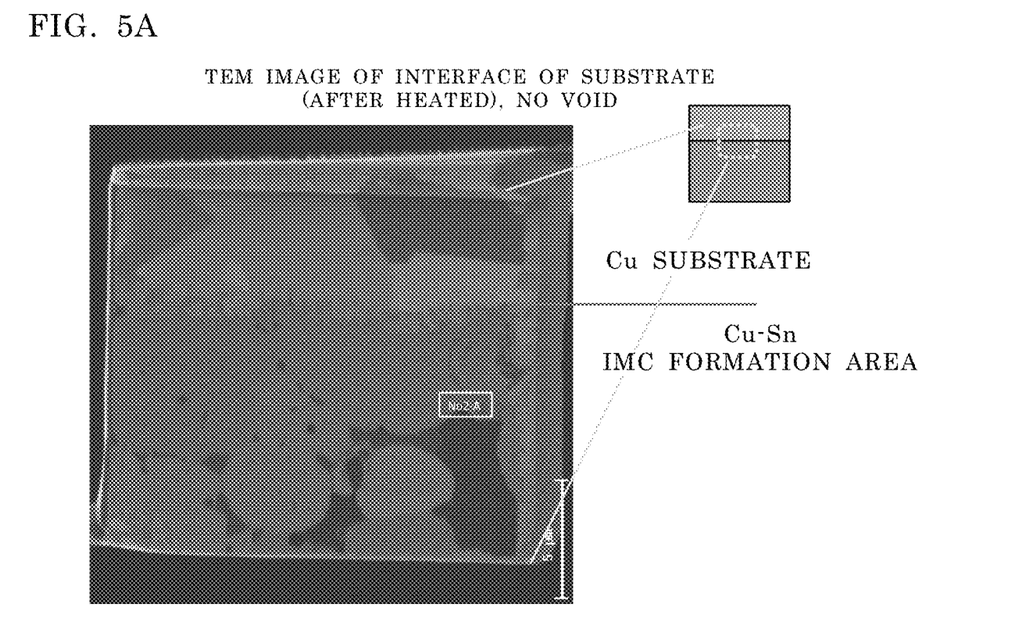
FIG. 5A shows a TEM image and so forth of an interface between a Cu electrode and a bonding structure, obtained in Example.
Figure 5B:
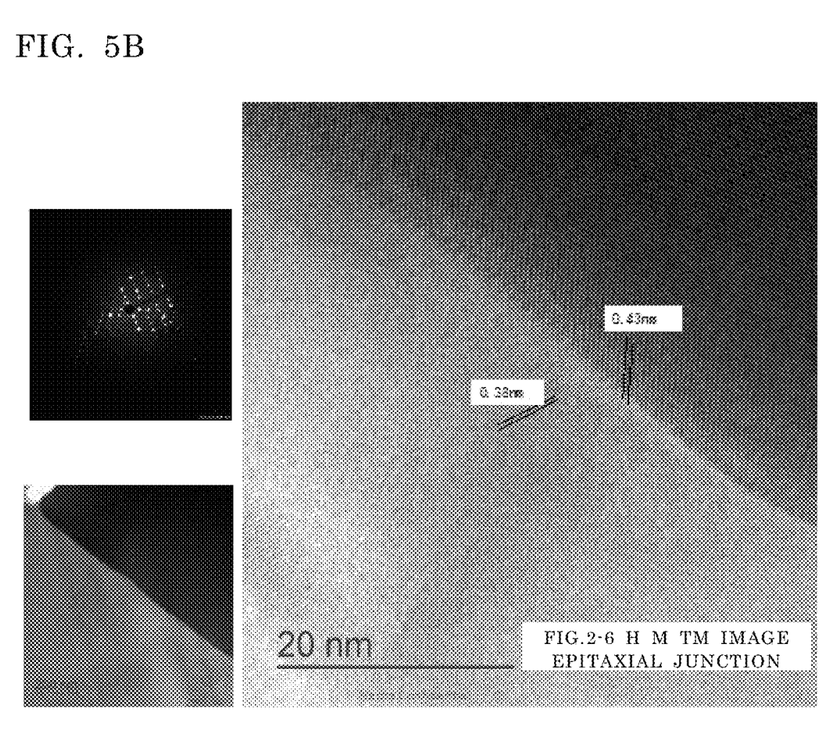
FIG. 5B shows TEM images and so forth of an interface between a Cu electrode and a bonding structure, obtained in Example.

FIGS. 5A and 5B are TEM images of the interface between the Cu electrode and the bonding structure obtained above. It was confirmed from FIGS. 5A and 5B that the Sn alloy matrix forms the epitaxial junction with the Cu electrode. From TEM images on the lower left and on the right in FIG. 5B, the Sn alloy matrix (bright area) in the bonding structure was confirmed to form the epitaxial junction with the Cu electrode (dark area). The image on the upper left in FIG. 5B is a transmission electron diffraction pattern of the Sn alloy matrix.

The electrode in this invention may be composed of simple metal, alloy body or intermetallic compound of at least one metal selected from the group consisting of Sn, Cu, Al, Ni, Si, Ag, Au, Pt, B, Ti, Bi, In, Sb, Ga, Zn, Cr and Co. Each of these substances can form the epitaxial junction, with the Sn alloy matrix.

This invention has been detailed referring to the attached drawings. This invention is, however, not limited by the description above. It is obvious that those skilled in the art will arrive at various modifications on the basis of the basic technical spirit and teaching of this invention.

What is claimed is:

1. A bonding structure comprising an intermetallic compound crystal composed of Sn and Cu, and a Sn alloy matrix composed of Sn and Cu, said bonding structure configured and adapted for bonding a metal body or an alloy body,
   the intermetallic compound crystal having a monoclinic or hexagonal crystal structure and forming an endotaxial junction with the Sn alloy matrix, and
   the Sn alloy matrix and/or the intermetallic compound crystal configured to form an epitaxial junction with the metal body or the alloy body.

2. The bonding structure according to claim 1, wherein the Sn alloy matrix forms the epitaxial junction with the metal body or the alloy body.

3. The bonding structure according to claim 1, wherein the metal body or the alloy body is composed of a simple metal, alloy or intermetallic compound of at least one metal selected from the group consisting of Sn, Cu, Al, Ni, Si, Ag, Au, Pt, B, Ti, Bi, In, Sb, Ga, Zn, Cr and Co.

4. The bonding structure according to claim 1, wherein the bonding structure contains 3 to 85% by volume of the intermetallic compound crystal.

5. The bonding structure according to claim 2, wherein the metal body or the alloy body is composed of a simple metal, alloy or intermetallic compound of at least one metal selected from the group consisting of Sn, Cu, Al, Ni, Si, Ag, Au, Pt, B, Ti, Bi, In, Sb, Ga, Zn, Cr and Co.

6. The bonding structure according to claim 2, wherein the bonding structure contains 3 to 85% by volume of the intermetallic compound crystal.

7. The bonding structure according to claim 3, wherein the bonding structure contains 3 to 85% by volume of the intermetallic compound crystal.

8. The bonding structure according to claim 5, wherein the bonding structure contains 3 to 85% by volume of the intermetallic compound crystal.

* * * * *